(12) United States Patent
Luong et al.

(10) Patent No.: US 9,628,309 B1
(45) Date of Patent: Apr. 18, 2017

(54) DEMODULATION WITH VARIABLE REMEMBRANCE FACTOR

(71) Applicant: QUALCOMM Incorporated, San Diego, CA (US)

(72) Inventors: Le Nguyen Luong, San Diego, CA (US); Yoshiro Fukuoka, Solana Beach, CA (US)

(73) Assignee: QUALCOMM Inc., San Diego, CA (US)

( * ) Notice: Subject to any disclaimer, the term of this patent is extended or adjusted under 35 U.S.C. 154(b) by 0 days.

(21) Appl. No.: 15/016,731

(22) Filed: Feb. 5, 2016

(51) Int. Cl.
*H04L 27/00* (2006.01)
*H04L 27/14* (2006.01)
*H04L 27/22* (2006.01)

(52) U.S. Cl.
CPC .............. *H04L 27/14* (2013.01); *H04L 27/22* (2013.01)

(58) Field of Classification Search
CPC .............. H04L 1/005; H04L 25/03057; H04L 27/2649; H04B 10/616; H04B 1/7103
USPC .................................. 375/262, 265, 341, 324
See application file for complete search history.

(56) References Cited

U.S. PATENT DOCUMENTS

| 5,764,690 | A | * | 6/1998 | Blanchard | H04B 1/707 370/210 |
|---|---|---|---|---|---|
| 7,151,740 | B2 | | 12/2006 | Zhang et al. | |
| 8,964,916 | B2 | | 2/2015 | Hoshyar et al. | |
| 2006/0222097 | A1 | * | 10/2006 | Gupta | H04L 25/0224 375/260 |
| 2008/0159446 | A1 | * | 7/2008 | Lai | H03G 3/3068 375/345 |
| 2010/0311350 | A1 | | 12/2010 | Dent et al. | |
| 2011/0026459 | A1 | | 2/2011 | Tsai et al. | |
| 2011/0107171 | A1 | * | 5/2011 | Mashino | H04J 11/0066 714/751 |
| 2012/0250546 | A1 | | 10/2012 | Hamida et al. | |
| 2012/0264467 | A1 | * | 10/2012 | Maruta | H04J 11/0036 455/501 |
| 2014/0321581 | A1 | * | 10/2014 | Luong | H04L 1/206 375/340 |

* cited by examiner

*Primary Examiner* — Leila Malek
(74) *Attorney, Agent, or Firm* — Muncy, Geissler, Olds & Lowe, P.C.

(57) ABSTRACT

A method performed by a wireless device includes receiving a first signal that contains one or more modulated symbols and determining a signal strength of the first signal. The method also includes adjusting a remembrance factor based on the signal strength of the first signal and demodulating the one or more modulated symbols based on the first signal and based on a number of previously demodulated symbols. The number of previously demodulated symbols utilized in the demodulation is based on the remembrance factor.

19 Claims, 5 Drawing Sheets

DEMODULATION WITH VARIABLE REMEMBRANCE FACTOR

FIELD OF DISCLOSURE

Aspects of this disclosure relate generally to wireless communications, and more particularly to demodulation for Bluetooth wireless communication.

BACKGROUND

Bluetooth is a type of wireless technology usually used for exchanging data between devices over short distances, for example, a personal area network (PAN). Although initial Bluetooth applications were used for communicating audio data (e.g., a wireless headset) or pointing device movement/selection data (e.g., a wireless mouse), recent Bluetooth applications are utilized for communicating entire data files and other discrete data that requires error-free transmission so as to avoid data corruption.

Decision feedback demodulation (DFD) is an effective technique to implement a low complexity demodulation that can reach the performance of the maximum likelihood sequence detection (MLSD) for continuous phase modulation. DFD is a recursive detection algorithm that utilizes known symbols that are based on the previously demodulated symbols. Conventional systems typically fix the number of previously demodulated symbols used for DFD to provide a predictable usage of memory. However, using a fixed number of previously demodulated symbols may lead to inconsistent performance when operated in differing wireless environments.

SUMMARY

In one example, a method performed by a wireless device includes receiving a first signal that contains one or more modulated symbols and determining a signal strength of the first signal. The method also includes adjusting a remembrance factor based on the signal strength of the first signal and demodulating the one or more modulated symbols based on the first signal and based on a number of previously demodulated symbols. The number of previously demodulated symbols utilized in the demodulation is based on the remembrance factor.

In another example, a wireless device includes means for receiving a first signal that contains one or more modulated symbols and means for determining a signal strength of the first signal. The wireless device also includes means for adjusting a remembrance factor based on the signal strength of the first signal and means for demodulating the one or more modulated symbols based on the first signal and based on a number of previously demodulated symbols. The number of previously demodulated symbols is based on the remembrance factor.

The at least one processor and the at least one memory are configured to direct the apparatus to: (i) receive a first signal that contains one or more modulated symbols; (ii) determine a signal strength of the first signal; (iii) adjust a remembrance factor based on the signal strength of the first signal; and (iv) demodulate the one or more modulated symbols based on the first signal and based on a number of previously demodulated symbols, where the number of previously demodulated symbols is based on the remembrance factor.

According to another example, a non-transitory computer-readable storage medium includes computer-executable instructions recorded thereon. Executing the computer-executable instructions on one or more processors of a wireless device causes the one or more processors to: (i) receive a first signal that contains one or more modulated symbols; (ii) determine a signal strength of the first signal; (iii) adjust a remembrance factor based on the signal strength of the first signal; and (iv) demodulate the one or more modulated symbols based on the first signal and based on a number of previously demodulated symbols, where the number of previously demodulated symbols is based on the remembrance factor.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
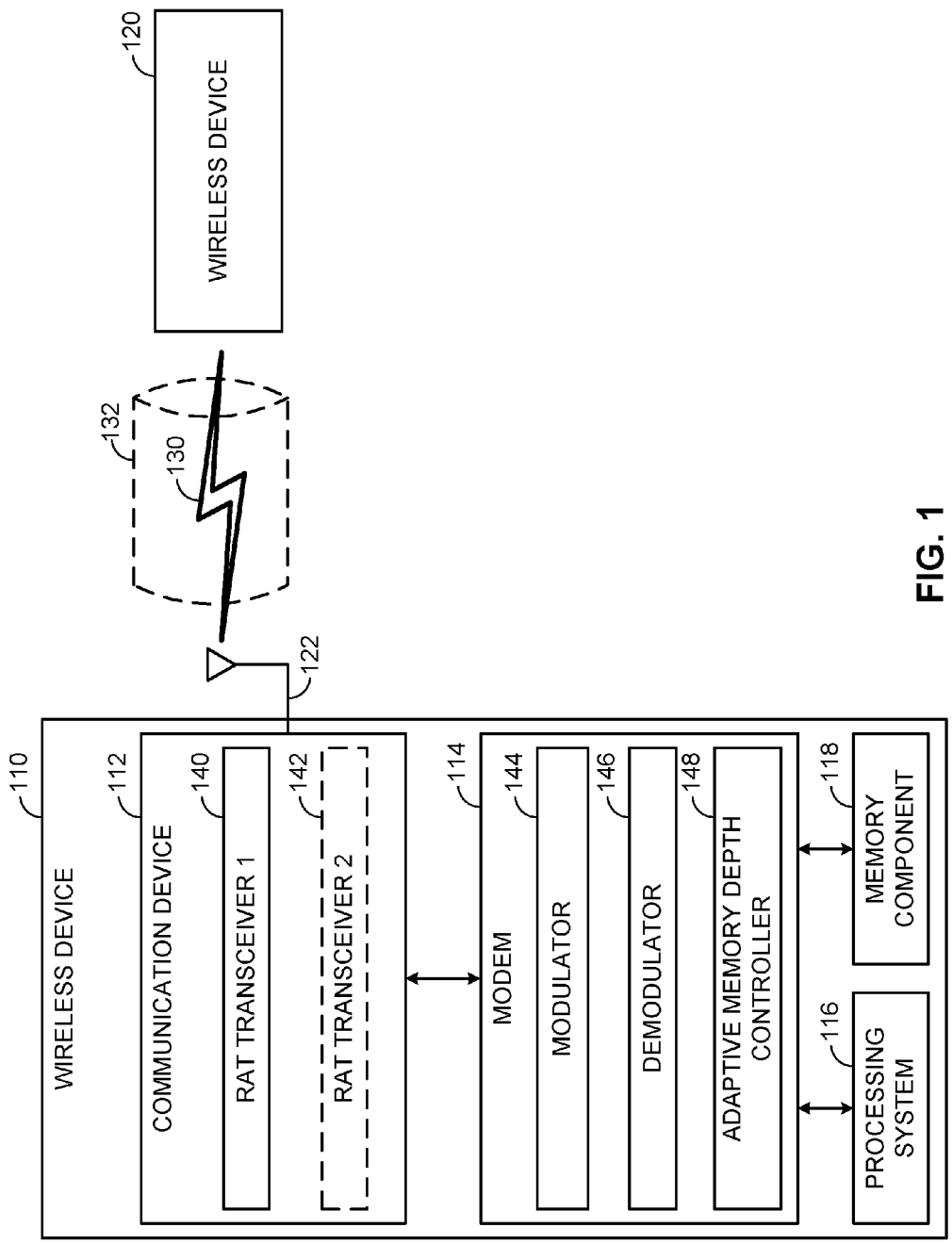
FIG. 1 illustrates an example wireless communication system including an wireless device in communication with another wireless device.

As mentioned above, Decision feedback demodulation (DFD) is an effective technique to implement a low complexity demodulation that can reach the performance of the maximum likelihood sequence detection (MLSD) for continuous phase modulation. DFD is a recursive detection algorithm that utilizes known symbols that are based on the previously demodulated symbols. Certain aspects disclosed herein utilize a dynamically determined remembrance factor that controls the number of previously demodulated symbols used in the demodulation process. In some aspects, the number of previously demodulated symbols may be referred to as memory depth because as the number of previously demodulated symbols used increases so too does the memory utilized by the demodulator.

In some examples the remembrance factor is adjusted based on the received signal strength. For example, in additive white Gaussian noise (AWGN) wireless environments where signal strength may be low, certain aspects of a wireless device may increase the remembrance factor. In such AWGN environments, a larger remembrance factor may allow the performance of the DFD to approach that of MLSD performance. However, the higher the remembrance factor, the more sensitive DFD may be to interference, radio impairments such as frequency offset, timing offset, I/Q imbalance, and so on. That is, when signal strength is high, such interference and/or radio impairments may be a dominant factor where a high remembrance factor for DFD may actually degrade demodulation performance. Accordingly, in such interference and/or radio impairment environments where signal strength is high, certain aspects of wireless devices described herein dynamically decrease the remembrance factor such that the DFD is more resistant to the interference and/or radio impairments.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 illustrates an example wireless communication system including an wireless device 110 in communication with another wireless device 120. Unless otherwise noted, the terms "wireless device" are not intended to be specific or limited to any particular Radio Access Technology (RAT). In general, wireless device 110 and or wireless device 120 may be any wireless communication device that wirelessly communicates (e.g., a mobile phone, router, personal computer, server, entertainment device, Internet of Things (IOT)/Internet of Everything (IOE) capable device, in-vehicle communication device, portable hard drive, PDA, computer gaming device, pointing device including a mouse, keyboard, pen, trackball, joystick, or any other type of controller, appliance, television, audio or video device, etc.), and may be alternatively referred to in different RAT environments as a User Device (UD), a Mobile Station (MS), a Subscriber Station (STA), a User Equipment (UE), etc.

In the example of FIG. 1, the wireless device 110 includes a communication device 112 for wirelessly communicating with other devices via at least one designated RAT. The communication device 112 may be variously configured for transmitting and encoding signals (e.g., messages, indications, information, and so on), and, conversely, for receiving and decoding signals (e.g., messages, indications, information, pilots, and so on) in accordance with the designated RAT. The wireless device 110 may also include a modem 114 coupled to the communication device 112. The communication device and modem may operate at the direction of or otherwise in conjunction with respective host system functionality (illustrated as the processing system 116 and memory component 118).

The processing system 116 may be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processing system 116 may be coupled, via one or more buses, to read information from or write information to memory component 118. The processing system 116 may additionally, or in the alternative, contain memory (for example, processor registers). The memory component 118 may include a processor cache, including a multi-level hierarchical cache in which different levels have different capacities and access speeds. The memory component 118 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives. The memory component 118 can store information that is used for one or more demodulation operations such as DFD, including threshold values or a number of previously demodulated symbols.

Wireless device 110 may further include an input device (not shown) and/or an output device (not shown) for, respectively, receiving input from and providing output to, a user of the wireless device 110. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, for example, detect voice commands). Suitable output devices include, but are not limited to, visual output devices, including displays and printers, audio output devices, including speakers, headphones, earphones, and alarms, and haptic output devices, including force-feedback game controllers and vibrating devices.

The processing system 116 is coupled to modem 114 and to one or more of the RAT transceivers of communication device 112. The modem 114 includes a modulator 144 for preparing and modulating data generated by the processing system 116 for wireless transmission via one or more transceivers of the communication device 112 and via the antenna 122 according to one or more air interface standards (for example, Bluetooth). The modem 114 also includes a demodulator 146 configured to demodulate data received via the antenna 122 according to one or more air interface standards. In some examples, demodulator 146 is configured to perform Decision Feedback Demodulation (DFD) operations utilizing a number of previously demodulated symbols based on a remembrance factor. The remembrance factor is dynamically controlled with an adaptive memory depth controller 148, which in some examples, adjusts the remembrance factor based on a received signal strength (e.g., received signal strength indicator (RSSI)).

The modem 114 and first RAT transceiver 140 and/or optional second RAT transceiver 142, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Turning to the illustrated communication in more detail, the wireless device 110 may transmit and receive messages via antenna 122 over a wireless link 130 with the wireless device 120, the messages including information related to various types of communication (e.g., voice, data, multimedia services, associated control signaling, etc.). The wireless link 130 may operate over a communication medium of interest, shown by way of example in FIG. 1 as the medium 132, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the wireless device 110 and the wireless device 120 for the medium 132.

As a particular example, the medium 132 may correspond to at least a portion of an unlicensed frequency band shared with other RATs. In general, the wireless device 110 and the wireless device 120 may operate via the wireless link 130 according to one or more RATs depending on the network in which they are deployed. These networks may include, for example, Bluetooth, Wi-Fi, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on.

In the example of FIG. 1, the wireless device 110 includes a first RAT transceiver 140 configured to operate in accordance with one RAT and, in some designs, an optional second RAT transceiver 142 configured to operate in accordance with another RAT. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The first RAT transceiver 140 and the second RAT transceiver 142 may provide different functionalities and may be used for different purposes. As an example, the first RAT transceiver 140 may operate in accordance with Bluetooth technology to provide communication with the wireless device 120 on the wireless link 130, while the second RAT transceiver 142 (if equipped) may operate in accordance with Wi-Fi technology to further communicate with wireless device 120 or another wireless device (not shown).

As mentioned above, the first RAT transceiver 140 may be configured to operate in accordance with Bluetooth technology. Bluetooth is a widely used Wireless Personal Area Network (WPAN) standard. The Bluetooth physical layer includes two types of modulation: (1) Gaussian Frequency-shift Keying (GFSK), which is a form of continuous phase modulation, and (2) Differential encoded M-ary phase-shift Keying (DPSK), where M can be 4 (referred to as DQPSK), or 8 (referred to as D8PSK), depending on the data rate.

For GFSK Modulation the complex baseband GFSK signal can be represented as:

$$s(t) = \sqrt{\frac{2E_b}{T}} e^{j(\phi(t,I)+\phi_0)} \quad \text{EQ (1)}$$

where $E_b$ is the bit energy; T is the bit period; I is the bit stream; $\phi_0$ is the initial phase.

The data dependent time-varying phase $\phi(t, I)$ is $$\phi(t, I) = 2\pi h \sum_{k=n-L+1}^{n} I(k)q(t-kT) + \pi h \sum_{k=0}^{n-L} I(k), \; nT < t \leq (n+1)T \quad \text{EQ (2)}$$

where h is the modulation index; (n+1) is the total number of transmitted bits and I(k)=0 for k<0; $q(t)=\int_0^t g(\tau)d\tau$, where g(t) is the impulse response of the Gaussian filter, which is a truncated output of the convolution between Gaussian pulse and a rectangular pulse of length T, L is the length of g(t) in bit periods. g(t) can be given by $$g(t) = \frac{1}{2T}\left[Q\left(2\pi B \frac{t-(L+1)T/2}{\sqrt{\ln 2}}\right) - Q\left(2\pi B \frac{t-(L-1)T/2}{\sqrt{\ln 2}}\right)\right] \quad \text{EQ (3)}$$

where Q(t) is the Q-function; B is the 3 dB bandwidth of the Gaussian filter, and B×T=0.5 for Bluetooth.

For additive white Gaussian noise (AWGN), the probability of error of the maximum-likelihood sequence detector (MLSD) for GFSK modulated signal can be found as $$P_e \cong Q\left(\sqrt{\frac{E_b}{N_0} d_{min}^2}\right) \quad \text{EQ (4)}$$

where $d_{min}$ is the minimum normalized Euclidean distance between two possible sequences of binary symbols $I_i$ and $I_j$, which is the minimum normalized Euclidean distance of paths through the trellis that separate at the node at t=0 and remerge at a later time at the same node, and can be expressed as $$d_{min}^2 = \min_{\gamma}\left[\frac{1}{T}\int_0^{NT}[1-\cos(\varphi(t,\gamma))]dt\right] \quad \text{EQ (5)}$$

where $\gamma=I_i-I_j$ and N (in symbol periods) is the interval of observation. Starting from t=0, it will take a minimum of (L+1)T symbols for the phase difference $\Phi(t, \gamma)$ to become zero again (equivalent to trellis remerge). For B×T=0.5, L=3 is sufficient to model the inter-symbol-interference (ISI) effect and hence $d_{min}$ for the observation interval of 4 symbols can be shown as $$d_{min}^2 = 4 - \frac{1}{T}\int_0^{4T} \cos[4\pi hq(t) - 4\pi hq(t-T)]dt \quad \text{EQ (6)}$$

For DPSK modulation, the complex baseband M-ary DPSK signal can be written as $$s(t) = \sum_{k=0}^{N} e^{j\Phi(k)} \delta(t-kT) \quad \text{EQ (7a)}$$

where N is the number of transmitted symbols; T is the symbol period; δ(t) is the delta-function and $$\Phi(k) = [\Phi(k-1) + a(k)]_{mod2\pi} = \left[\Phi(0) + \sum_{m=1}^{k} a(m)\right]_{mod2\pi} \quad \text{EQ (7b)}$$

where $\alpha(n) \in \{(\Phi_1, \Phi_2, \ldots, \Phi_M\}, \Phi_i \in (-\pi, \pi]$. Equation (7a) can be rewritten as $$s(t) = e^{j\phi(0)}\tilde{s}(t) \quad \text{EQ (8)}$$

where $$\tilde{s}(t) = \delta(t) + \sum_{k=1}^{N} e^{j(\sum_{m=1}^{k} a(m))} \delta(t - kT) \quad \text{EQ (9)}$$

For AWGN, the discrete time received complex baseband signal can be shown as $$r[n] = e^{j(\phi_c + \phi(0))}\tilde{s}[n] + w[n] \quad \text{EQ (10)}$$

where w[n] is a complex white Gaussian noise; $\phi_c$ is the channel phase and $$\tilde{s}[n] = \delta[n] + \sum_{k=1}^{N} e^{j(\sum_{m=1}^{k} a(m))} \delta[n - k] \quad \text{EQ (11)}$$

For high signal-to-noise ratio (SNR), the probability of bit error of the maximum likelihood sequence detection (MLSD) for M-ary DPSK is approximated by $$P_b \approx \frac{4}{\log_2 M} Q\left(\sqrt{2\log_2 M \frac{E_b}{N_0}} \sin\frac{\pi}{M}\right) \quad \text{EQ (12)}$$

Given the signal models and theoretical bounds for both GFSK and DPSK given above by way of equations 1-12, attention is now given to example derivation and operation of Decision Feedback Modulation (DFD).

First, with respect to DPSK modulation, assuming a block of length N of M-ary symbols a=[a(1), a(2), . . . , a(N)] was transmitted. In equation (10), the term $(\phi_c + \phi(0))$ is the phase reference required for coherent demodulation. For non-coherent demodulation, in the absence of this phase reference, it can be treated as a nuisance parameter modeled as a random variable uniformly distributed in $(-\pi, \pi]$. The optimum receiver in this case is to maximize the decision metric $$|X_i[N]| = \left|\sum_{n=0}^{N} r[n]\tilde{s}_i^*[n]\right| \quad \text{EQ (13)}$$

where (.)* denotes the complex conjugation, and $$\tilde{s}_i[n] = \delta[n] + \sum_{k=1}^{N} e^{j(\sum_{m=1}^{k} a_i(m))} \delta[n - k] \quad \text{EQ (14)}$$

where $a_i = [a_i(1), a_i(2), \ldots, a_i(N)]$ covers all possible a. From equations (13) and (14), the decision metric can be expressed as $$|X_i[N]| = \left|\sum_{n=0}^{N}\left(\delta[n]r[n] + \sum_{k=1}^{N} e^{-j(\sum_{m=1}^{k} a_i(m))}\delta[n-k]r[n]\right)\right| \quad \text{EQ (15)}$$

$$= \left|r[0] + \sum_{k=1}^{N} e^{-j(\sum_{m=1}^{k} a_i(m))} r[k]\right|$$

Assuming the first L, (L<N), symbols are known to the receiver. Let these known symbols be $a_i(n) = c(n)$, n=1, 2, . . . , L. The decision metric can be written as $$|X_i[N]| = \left|r[0] + \sum_{k=1}^{L} e^{-j(\sum_{m=1}^{k} a_i(m))} r[k] + \sum_{k=L+1}^{N} e^{-j(\sum_{m=1}^{k} a_i(m))} r[k]\right| \quad \text{EQ (16)}$$

$$= \left|r[0] + \sum_{k=1}^{L} e^{-j(\sum_{m=1}^{k} c(m))} r[k] + \right.$$

$$\left. \sum_{k=L+1}^{N} e^{-j(\sum_{m=1}^{L} c(m) + \sum_{m=L+1}^{k} a_i(m))} r[k]\right|$$

$$= \left|r[0] + e^{-j(\sum_{m=1}^{L} c(m))} \sum_{k=1}^{L} e^{-j(\sum_{m=1}^{k} c(m) - \sum_{m=1}^{L} c(m))} r[k] + \right.$$

$$\left. e^{-j(\sum_{m=1}^{L} c(m))} \sum_{k=L+1}^{N} e^{-j(\sum_{m=L+1}^{k} a_i(m))} r[k]\right|$$

$$= \left|e^{-j(\sum_{m=1}^{L} c(m))}\left[e^{+j(\sum_{m=1}^{L} c(m))} r[0] + \sum_{k=1}^{L} e^{j(\sum_{m=k+1}^{L} c(m))} r[k] + \right.\right.$$

$$\left.\left. \sum_{k=L+1}^{N} e^{-j(\sum_{m=L+1}^{k} a_i(m))} r[k]\right]\right|$$

$$= \left|\sum_{k=0}^{L} e^{j(\sum_{m=k+1}^{L} c(m))} r[k] + \sum_{k=L+1}^{N} e^{-j(\sum_{m=L+1}^{k} a_i(m))} r[k]\right|$$

$$= \left|Y[L] + \sum_{k=L+1}^{N} e^{-j(\sum_{m=L+1}^{k} a_i(m))} r[k]\right|$$

where $Y[L] = \sum_{k=0}^{L} e^{j\sum_{m=k+1}^{L} c(m)} r[k]$ depends only on the known symbols. Y[L] can be rewritten as $$Y[L] = \sum_{k=0}^{L-1} e^{j(\sum_{m=k+1}^{L} c(m))} r[k] + r[L] \quad \text{EQ (17)}$$

$$= \sum_{k=0}^{L-1} e^{j(\sum_{m=k+1}^{L} c(m))} r[k] + r[L]$$

$$= e^{jc(L)} \sum_{k=0}^{L-1} e^{j(\sum_{m=k+1}^{L-1} c(m))} r[k] + r[L]$$

Thus, Y[L] can be obtained recursively as $$Y[L] = e^{jc(L)} Y[L-1] + r[L] \quad \text{EQ (18)}$$

If L=N-1, equation (16) becomes $$|X_i[N]| = |Y(N-1) + e^{-ja_i(N)} r[N]| \quad \text{EQ (19)}$$

Therefore, $$|X_i[N]|^2 = |Y(N-1)|^2 + |r[N]|^2 + 2Re\{Y^*(N-1) r[N]e^{-ja_i(N)}\} \quad \text{EQ (20)}$$

Since both $Y[N-1]$ and $r[N]$ are the same for all $|X_i[N]|^2$, the decision metric is maximized when maximizing the third term $$\text{Re}\{Y^*(N-1)r[N]e^{-ja_i(N)}\} = \text{Re}\{|Y^*(N-1)r[N]|e^{j\phi(N)}e^{-ja_i(N)}\} \quad \text{EQ (21)}$$

$$= |Y^*(N-1)r[N]|\cos[\phi(N) - a_i(N)]$$

where $Y^*(N-1)r(N)$ is expressed in terms of its magnitude and angle $\phi(N)$. This is equivalent to maximization of $\cos[\phi(N)-a_i(N)]$ over all possible values $\{\Phi_1, \Phi_2, \ldots, \Phi_M\}$ that $a_i(N)$ can take. Thus the value of $a_i(N)$ that has the shortest distance with $\phi(N)$ may be chosen, and is known as the hard decision for $a_i(N)$. The recursive detection algorithm (i.e., decision feedback demodulation) can be implemented using equation (18) and hard decision decoding of $\phi(N)$, where the known symbols are based on the previous demodulated symbols. Equation (18) represents an infinite memory system where all the past data is equally weighted. In order to limit the memory and have tracking capabilities, embodiments herein use a remembrance factor $\alpha$, $0 \leq \alpha \leq 1$. Thus $Y[n]$ can be realized by the discrete time linear filter $$Y(n) = \alpha \cdot Y(n-1)e^{j\hat{c}(n)} + r(n) \quad \text{EQ (22)}$$

where $\hat{c}(n)$ denotes the estimate of $a(n)$. The decision feedback demodulation can be summarized as $$\begin{cases} Y(n) = \alpha \cdot Y(n-1)e^{j\hat{c}(n)} + r(n) \\ \hat{c}(n) = \text{angle}[Y^*(n-1)r(n)]|_{hard\,decision} \end{cases} \quad \text{EQ (23)}$$

Thus, demodulating DPSK modulated symbols according to a DFD operation may include determining the metric $Y(n)$ at time index n, which may also be expressed as $$Y(n) = \sum_{k=0}^{n} \alpha^{n-k} e^{-j(\sum_{m=k+1}^{n}\hat{c}(m))} r(k) \quad \text{EQ (24)}$$

where $\alpha$ is the remembrance factor, $0 \leq \alpha \leq 1$, $\hat{c}(m)$ is a demodulated symbol at time index m, and $r(k)$ is the received signal (e.g., received by RAT transceiver 140) at time index k. Since $\alpha \leq 1$, not all the terms in the summation of equation (24) will have significant role as $\alpha^{n-k}$ approaching zero (0) and the value of $\alpha$ determines how many terms (i.e., previously demodulated symbols) can be used.

Second, with respect to GFSK modulation, from equation (3) of the impulse response of the Gaussian filter, the followings are held true:

$$q(LT) = \int_0^{LT} g(\tau)d\tau = \frac{1}{2}$$

and $$q(t) + q(LT-t) = \frac{1}{2} \text{ for } 0 \leq t \leq LT.$$

Let $\phi(nT)$ denote for $\phi(nT, I)$, the phase of the signal sampled at the symbol rate. For L=3, from equation (2) we have $$\phi(nT) = 2\pi h \sum_{k=n-2}^{n} I(k)q(nT-kT) + \pi h \sum_{k=0}^{n-3} I(k) \quad \text{EQ (25)}$$

$$= 2\pi h I(n-2)q(2T) + 2\pi h I(n-1)q(T) +$$

$$2\pi h I(n)q(0) + \pi h \sum_{k=0}^{n-3} I(k)$$

$$= 2\pi h I(n-2)\left(\frac{1}{2} - q(T)\right) + 2\pi h I(n-1)q(T) +$$

$$\pi h \sum_{k=0}^{n-3} I(k)$$

$$= 2\pi h q(T)[I(n-1) - I(n-2)] + \pi h \sum_{k=0}^{n-2} I(k)$$

$$= \pi h \sum_{k=0}^{n-2} I(k) + \Delta\phi(n)$$

where $$\Delta\phi(n) = \begin{cases} 0; & I(n-1)I(n-2) = 1 \\ 4\pi h q(T) \approx 0.21\pi h; & I(n-1) = 1, I(n-2) = -1 \\ -4\pi h q(T) \approx -0.21\pi h; & I(n-1) = -1, I(n-2) = 1 \end{cases} \quad \text{EQ (26)}$$

Thus, the sampled complex baseband GFSK signal can be written as $$s(nT) = \sqrt{\frac{2E_b}{T}} e^{j(\pi h \sum_{k=0}^{n-2} I(k) + \Delta\phi(n) + \phi_0)} \quad \text{EQ (27)}$$

In AWGN, the received complex baseband signal is $r(t) = s(t) + \tilde{n}(t)$, where $\tilde{n}(t)$ is circularly symmetric complex Gaussian noise. Assuming perfect timing at the receiver, the received signal sampled at the symbol rate is $$r(nT) = \sqrt{\frac{2E_b}{T}} e^{j(\pi h \sum_{k=0}^{n-2} I(k) + \Delta\phi(n) + \phi_0)} + \tilde{n}(nT) \quad \text{EQ (28)}$$

Assuming N bits were transmitted, a receiver based on maximum-likelihood (ML) criterion is to maximize the decision metric $$|X_i(N)|^2 = \left|\sum_{n=1}^{N} r(nT)\tilde{s}^*(nT, I_i)\right|^2 \quad \text{EQ (29)}$$

where $\tilde{S}(nT, I_i) = e^{j(\pi h \sum_{k=0}^{n-2} I_i(k) + \Delta\phi_i(n))}$, and $I_i$ covers all possible I. For simplification, the $\Delta\phi_i(n)$ in $\tilde{S}(nT, I_i)$ is ignored. Let $r(n)$ denote for $r(nT)$, the decision metric can be expressed as $$|X_i(N)|^2 = \left|\sum_{n=1}^{N} r(n)e^{-j(\pi h \sum_{k=0}^{n-2} I_i(k))}\right|^2 \quad \text{EQ (30)}$$

If the receiver knows the first P bits in advance because of training sequence or decision feedback, and let m(k) denote the known $I_i(k)$, the decision metric can be expressed as follows $$|X_i(N)|^2 = \left|\sum_{n=1}^{P+1} r(n)e^{-j\pi h \sum_{k=0}^{n-2} m(k)} + \right.$$
$$\left. e^{-j\pi h \sum_{k=0}^{P-1} m(k)} \sum_{n=P+2}^{N} r(n)e^{-j\pi h \sum_{k=P}^{n-2} I_i(k)}\right|^2$$

$$= \left|e^{-j\pi h \sum_{k=0}^{P-1} m(k)}\left\{e^{j\pi h \sum_{k=0}^{P-1} m(k)}\sum_{n=1}^{P+1} r(n)e^{-j\pi h \sum_{k=0}^{n-2} m(k)} + \right.\right.$$
$$\left.\left. \sum_{n=P+2}^{N} r(n)e^{-j\pi h \sum_{k=P}^{n-2} I_i(k)}\right\}\right|^2$$

$$= \left|e^{-j\pi h \sum_{k=0}^{P-1} m(k)}\left\{\sum_{n=1}^{P+1} r(n)e^{j\pi h (\sum_{k=0}^{P-1} m(k)-\sum_{k=0}^{n-2} m(k))} + \right.\right.$$
$$\left.\left. \sum_{n=P+2}^{N} r(n)e^{-j\pi h \sum_{k=P-1}^{n-2} I_i(k)}\right\}\right|^2$$

$$= \left|e^{-j\pi h \sum_{k=0}^{P-1} m(k)}\right|^2 \left|\sum_{n=1}^{P+1} r(n)e^{j\pi h (\sum_{k=0}^{P-1} m(k)-\sum_{k=0}^{n-2} m(k))} + \right.$$
$$\left. \sum_{n=P+2}^{N} r(n)e^{-j\pi h \sum_{k=P-1}^{n-2} I_i(k)}\right|^2$$

$$= \left|\sum_{n=1}^{P+1} r(n)e^{j\pi h (\sum_{k=0}^{P-1} m(k)-\sum_{k=0}^{n-2} m(k))} + \right.$$
$$\left. \sum_{n=P+2}^{N} r(n)e^{-j\pi h \sum_{k=P-1}^{n-2} I_i(k)}\right|^2 \quad \text{EQ (31)}$$

Since $n \leq (P+1)$ for the first term, $\Sigma_{k=0}^{P-1}m(k)=\Sigma_{k=0}^{n-2}m(k)+\Sigma_{k=n-1}^{P-1}m(k)$. Note that $\Sigma_{k=P}^{P-1}m(k)=0$ when $n=(P+1)$. The decision metric now becomes $$|X_i(N)|^2 = \left|\sum_{n=1}^{P+1} r(n)e^{j\pi h \sum_{k=n-1}^{P-1} m(k)} + \sum_{n=P+2}^{N} r(n)e^{-j\pi h \sum_{k=P-1}^{n-2} I_i(k)}\right|^2 \quad \text{EQ (32)}$$

$$= \left|M(P+1) + \sum_{n=P+2}^{N} r(n)e^{-j\pi h \sum_{k=P-1}^{n-2} I_i(k)}\right|^2$$

where $M(P+1)=\Sigma_{n=1}^{P+1}r(n)e^{j\pi h \Sigma_{k=n-1}^{P-1}m(k)}$, which can be rearranged as $$M(P+1)=M(P)e^{j\pi h m(P-1)}+r(P+1) \quad \text{EQ (33)}$$

Thus, M (P+1) is the same for all $|X_i[N]|^2$. Let the decision feedback scheme operate in such a way that at time NT the first (N−2) bits are fed back to demodulate the $(N-2)^{th}$ bit (note that the bit index started from 0). Therefore, P=(N−2) is used in equation (32), and the decision metric can be expressed as $$|X_i(N)|^2 = \left|M(N-1) + \sum_{n=N}^{N} r(n)e^{-j\pi h \sum_{k=N-2}^{n-2} I_i(k)}\right|^2 \quad \text{EQ (34)}$$

$$= |M(N-1) + r(N)e^{-j\pi h I_i(N-2)}|^2$$

$$= |M(N-1)|^2 + |r(N)e^{-j\pi h I_i(N-2)}|^2 +$$

-continued
$$2\text{Re}\{M^*(N-1)r(N)e^{-j\pi h I_i(N-2)}\}$$
$$= |M(N-1)|^2 + |r(N)|^2 +$$
$$2\text{Re}\{M^*(N-1)r(N)e^{-j\pi h I_i(N-2)}\}$$

Since the first two terms of (34) are the same for all $|X_i[N]|^2$, the decision metric is maximized when maximizing the third term, namely $$\hat{X}_i(N) = 2\text{Re}\{M^*(N-1)r(N)e^{-j\pi h I_i(N-2)}\} \quad \text{EQ (35)}$$
$$= 2\text{Re}\{|M^*(N-1)r(N)|e^{j\theta(N)}e^{-j\pi h I_i(N-2)}\}$$
$$= 2|M^*(N-1)r(N)|\cos(\theta(N) - \pi h I_i(N-2))$$

where $\theta(N)$ is the argument of $M^*(N-1)r(N)$. Since $I_i \in \{-1, +1\}$, clearly $\hat{X}_i(N)$ will be maximized when $I_i(N-2)$ and $\theta(N)$ have the same sign. Therefore, the detection of $I_i(N-2)$, namely $d(N-2)=\text{sign}[\theta(N)]=\text{sign}[\text{Im}\{M^*(N-1)r(N)\}]$ can be determined. Similar to DPSK case, equation (33) represents an infinite memory system where all the past data is equally weighted. In practical implementation and to introduce tracking capability, a remembrance factor $\alpha$, $0 \leq \alpha \leq 1$, is introduced. The decision feedback demodulation for GFSK can be summarized as $$\begin{cases} M(n) = \alpha \cdot M(n-1)e^{j\pi h d(n-2)} + r(n) \\ d(n-2) = \text{sign}[\text{Im}\{M^*(n-1)r(n)\}] \end{cases} \quad \text{EQ (36)}$$

Thus, demodulating GFSK modulated symbols according to a DFD operation may include determining the metric M(n) at time index n, which may also be expressed as $$M(n) = \alpha M(n-1)e^{j\pi h d(N-2)} + r(n) \quad \text{EQ (37)}$$
$$= \sum_{k=1}^{n} \alpha^{n-k} r(k) e^{j\pi h \sum_{m=n-1}^{n-2} d(m)}, \text{ with } \sum_{m=n-1}^{n-2} d(m) = 0$$

where $\alpha$ is the remembrance factor, $0 \leq \alpha \leq 1$, d(m) is a demodulated symbol at time index m, and r(k) is the received signal (e.g., received at RAT transceiver 140) at time index k. As with DPSK, the value of the remembrance factor $\alpha$ determines how may terms (i.e., previously demodulated symbols) in the summation of equation (37) will be used.

Figure 2:
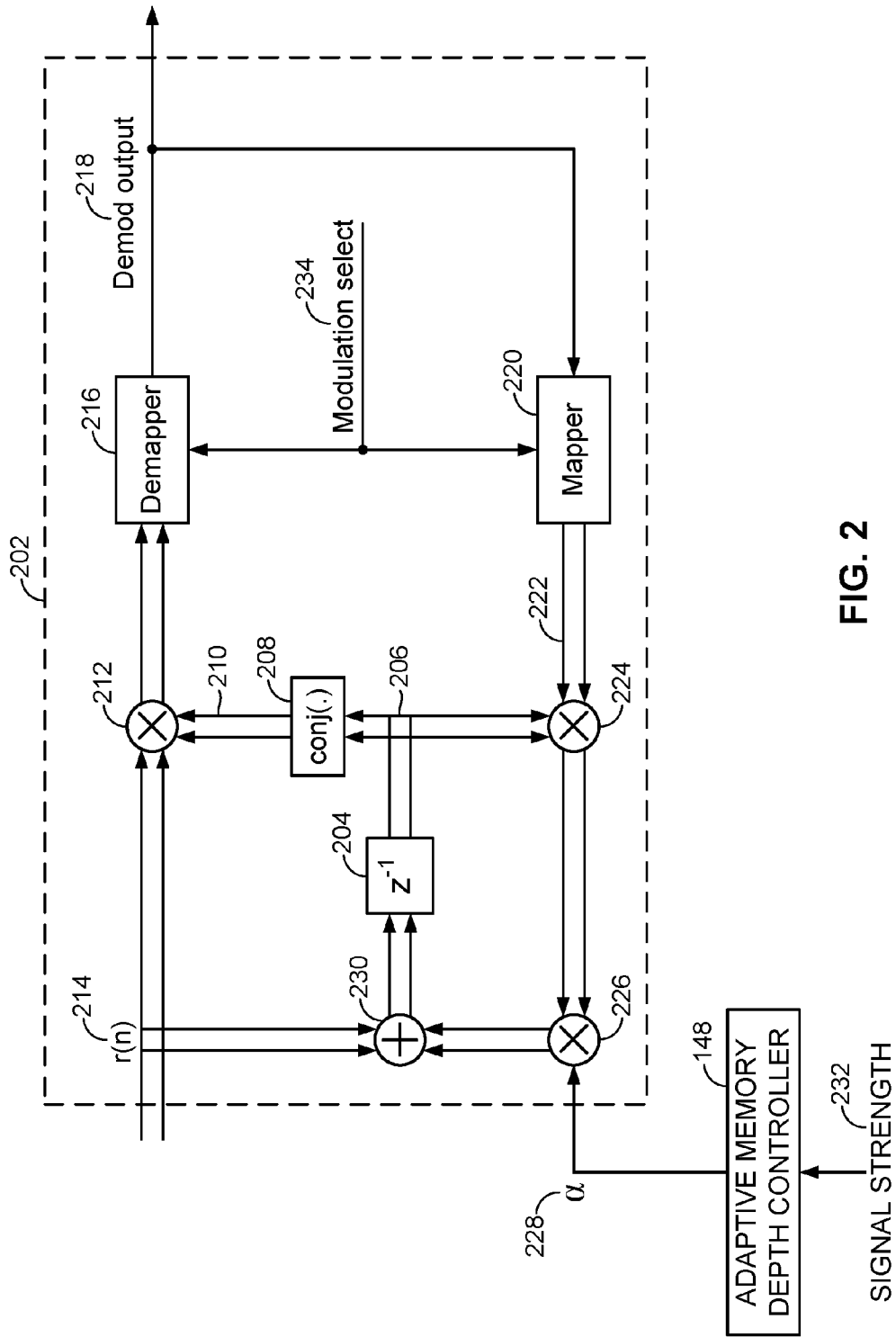
FIG. 2 illustrates an example demodulator of a wireless device.

Equations (23) and (36), show that the DFD operation for DPSK and for GFSK, respectively, may have the same structure. Therefore, a unified DFD operation can be used for both. Accordingly, FIG. 2 illustrates an example demodulator 202 of a wireless device that is configured to perform DFD operations for both DPSK and GFSK. Demodulator 202 is one possible implementation of demodulator 146 of FIG. 1.

The illustrated structure of demodulator 202 maps to the operations depicted in equations (23) and (36) described above. For example, block 204 is configured to generate an output 206 that is representative of the metric Y(n) or M(n) (depending on whether GFSK or DPSK), whereas block 208 is configured to perform the complex conjugation operation. The output 210 of block 208 is then multiplied with the received signal r(n) 214 by way of multiplier 212, the result of which is then provided to demapper 216. If the modulation select input 234 indicates DPSK, then the demapper 216 is configured to determine the phase angle of the complex number represented by equation (23). If the modulation select input 234 indicates GFSK, then the demapper 216 is configured to determine the sign (i.e., positive or negative) of the imaginary portion of equation (36). As shown in FIG. 2, the demodulated output 218 is then fed back to mapper 220. The mapper 220 is configured to determine the term $e^{j\pi hd(n-2)}$ for GFSK and the term $e^{j\tilde{e}(n)}$ for DPSK in response to the modulation select input 234. The output 222 of the mapper 220 is then multiplied with the metric Y(n) or M(n) by way of multiplier 224, the output of which is then multiplied with the remembrance factor α 228. The output of multiplier 226 is then provided to summer which adds the output of multiplier 226 with the received signal r(n) 214 to provide the result back to block 204.

As shown in FIG. 2, the adaptive memory depth controller 148 is configured to provide the demodulator 202 with the remembrance factor α, which determines the number of previously demodulated symbols utilized by demodulator 202 when performing the DFD operation. In certain aspects, the adaptive memory depth controller 148 dynamically adjusts the remembrance factor α 228 based on a signal strength 232 of the received signal r(n) 214. In some examples, the signal strength 232 is the received signal strength indicator (RSSI) of the received signal r(n) 214.

As will be described in more detail below, the adaptive memory depth controller 148 may be configured to increase the remembrance factor α 228 in response to decreases in the signal strength 232 of received signal r(n) 214 and also to decrease the remembrance factor α 228 in response to increases in the signal strength 232. Thus, when signal strength 232 indicates that the signal strength of received signal r(n) 214 is low, adaptive memory depth controller 148 increases the remembrance factor α 228, such that the performance of the DFD operation of demodulator 202 improves in an assumed AWGN environment. Similarly, when signal strength 232 indicates that the signal strength of the received signal r(n) 214 is high, the adaptive memory depth controller 148 decreases the remembrance factor α 228 such that the DFD operation of demodulator 202 is more resistant to the interference and/or radio impairments.

In some examples, adaptive memory depth controller 148 may continuously adjust the remembrance factor α 228 in response to changes in the signal strength 232 of the received signal r(n) 214 (e.g., proportionally, exponentially, etc.). However, in other examples, the adaptive memory depth controller 148 may select a value of the remembrance factor α 228 from a fixed set of discrete values. For example, in one implementation, the adaptive memory depth controller 148 may compare the signal strength 232 with a signal strength threshold. When the signal strength 232 is less than the signal strength threshold the adaptive memory depth controller 148 may set the remembrance factor α 228 to a first value and when the signal strength 232 is greater than or equal to the signal strength threshold the adaptive memory depth controller 148 may set the remembrance factor α 228 to a second value. In this example, the first value is higher than the second value such that the remembrance factor α 228 is larger for signal strengths 232 less than the signal strength threshold and the remembrance factor α 228 is lower for signal strengths 232 greater than or equal to the signal strength threshold.

Figure 3:
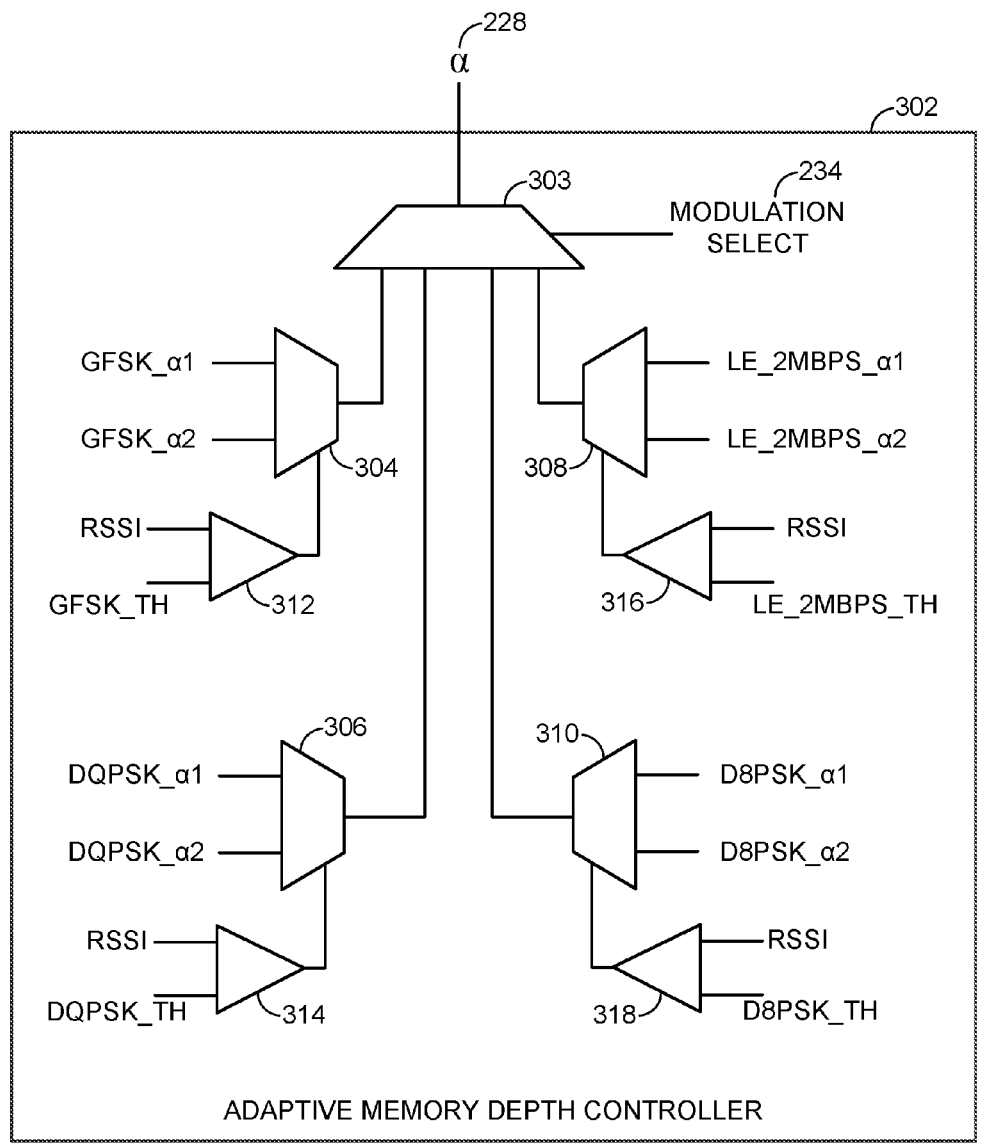
FIG. 3 illustrates an example adaptive memory depth controller of a wireless device.

FIG. 3 illustrates an example adaptive memory depth controller 302 of a wireless device. Adaptive memory depth controller 302 is one possible implementation of adaptive memory depth controller 148 of FIGS. 1 and 2. As mentioned above, the Bluetooth physical layer includes two types of modulation: (1) Gaussian Frequency-shift Keying (GFSK), and (2) Differential encoded M-ary phase-shift Keying (DPSK). Thus, the modulated symbols included in the received signal r(n) may include GFSK modulated symbols, DPSK modulated symbols, DQPSK modulated symbols, or D8PSK modulated symbols, where the mode of modulation (i.e., GFSK mode, DQSPK mode, D8PSK mode, or low-energy 2 Mbps mode) may be indicated by the modulation select input 234. In certain implementations, the different demodulation modes may have differing values for the signal strength threshold of when to adjust the remembrance factor α 228. Even still, the different demodulation modes may have differing values for the remembrance factor α 228, itself. Accordingly, the example adaptive memory depth controller 302 of FIG. 3 is configured to determine the demodulation mode of the wireless device, select a signal strength threshold based on the demodulation mode, compare the signal strength (e.g., RSSI) to the selected threshold, and then select a value for the remembrance factor α 228 from a plurality of values associated with the current demodulation mode.

In the illustrated example of FIG. 3, adaptive memory depth controller 302 includes a main multiplexer 303, a GFSK multiplexer 304, a DQPSK multiplexer 306, a low energy multiplexer 308, and a D8PSK multiplexer 310. Adaptive memory depth controller 302 also includes a GFSK comparator 312, a DQPSK comparator 314, a low energy comparator 316, and a D8PSK comparator 318. In operation, GFSK comparator 312 compares the RSSI with a GFSK_TH threshold that is a signal strength threshold specific for the GFSK mode of modulation. The output of GFSK comparator 312 controls whether GFSK multiplexer 304 provides GFSK_α1 or GFSK_α2 as the value of the remembrance factor α to main multiplexer 303. DQPSK comparator 314 compares the RSSI with a DQPSK_TH threshold that is a signal strength threshold specific for the DQPSK mode of modulation. The output of DQPSK comparator 314 controls whether DQPSK multiplexer 306 provides DQPSK_α1 or DQPSK_α2 as the value of the remembrance factor α to main multiplexer 303. The low energy comparator 316 compares the RSSI with a LE_2MBPS_TH threshold that is a signal strength threshold specific for the low energy 2 Mbps mode of modulation. The output of low energy comparator 316 controls whether low energy multiplexer 308 provides LE_2MBPS_α1 or LE_2MBPS_α2 as the value of the remembrance factor α to main multiplexer 303. D8PSK comparator 318 compares the RSSI with a D8PSK_TH threshold that is a signal strength threshold specific for the D8PSK mode of modulation. The output of D8PSK comparator 318 controls whether D8PSK multiplexer 310 provides D8PSK_α1 or D8PSK_α2 as the value of the remembrance factor α to main multiplexer 303. The main multiplexer 303 then selects which of the values of the remembrance factor α 228 to output in response to the modulation select input 234 (e.g., main multiplexer 303 outputs the value provided by GFSK multiplexer 304 in response to the modulation select input 234 indicating the GFSK mode of modulation).

Although FIG. 3 illustrates adaptive memory depth controller 302 as providing signal strength thresholds and values of remembrance factor α 228 for four modulation modes (GFSK, DQPSK, Low energy 2 Mbps, and D8PSK), adaptive memory depth controller 302 may be configured to implement more or less than the modes illustrated. For example, adaptive memory depth controller 302 may be configured to only provide remembrance factor α 228 based on a GFSK mode and one of the DQPSK or D8PSK modes of modulation.

Figure 4:
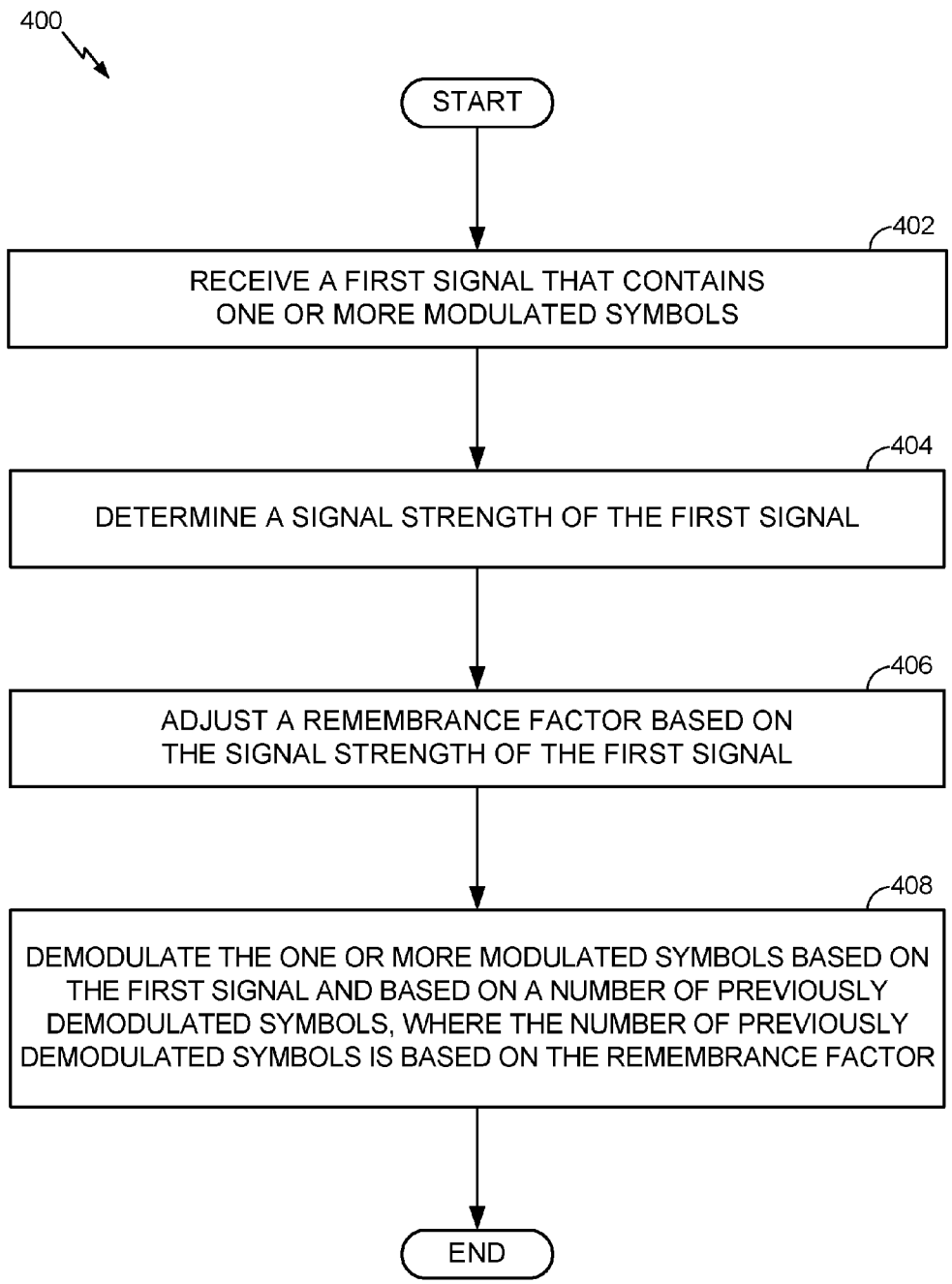
FIG. 4 is a flow diagram illustrating an example process of demodulation.

FIG. 4 is a flow diagram illustrating an example process 400 of demodulation. In a process block 402, RAT transceiver 140 receives a first signal (e.g., received signal r(n)) that contains one or more modulated symbols. Next, in process block 404, adaptive memory depth controller 148 determines a signal strength of the first signal (e.g., by way of RSSI). In process block 406, the adaptive memory depth controller 148 adjusts the remembrance factor α based on the signal strength of the first signal. As mentioned above, the adaptive memory depth controller 148 may increase the remembrance factor α in response to decreases in the signal strength and may decrease the remembrance factor α in response to increases in the signal strength. In process block 408, the demodulator 146 demodulates the one or more modulated symbols based on the first signal (i.e., received signal r(n)) and based on a number of previously demodulated symbols. The number of previously demodulated symbols utilized in the demodulation of the modulated symbols is determined based on the remembrance factor, as described above with reference to equations (23) and (24) for DPSK, and equations (36) and (37) for GFSK.

Figure 5:
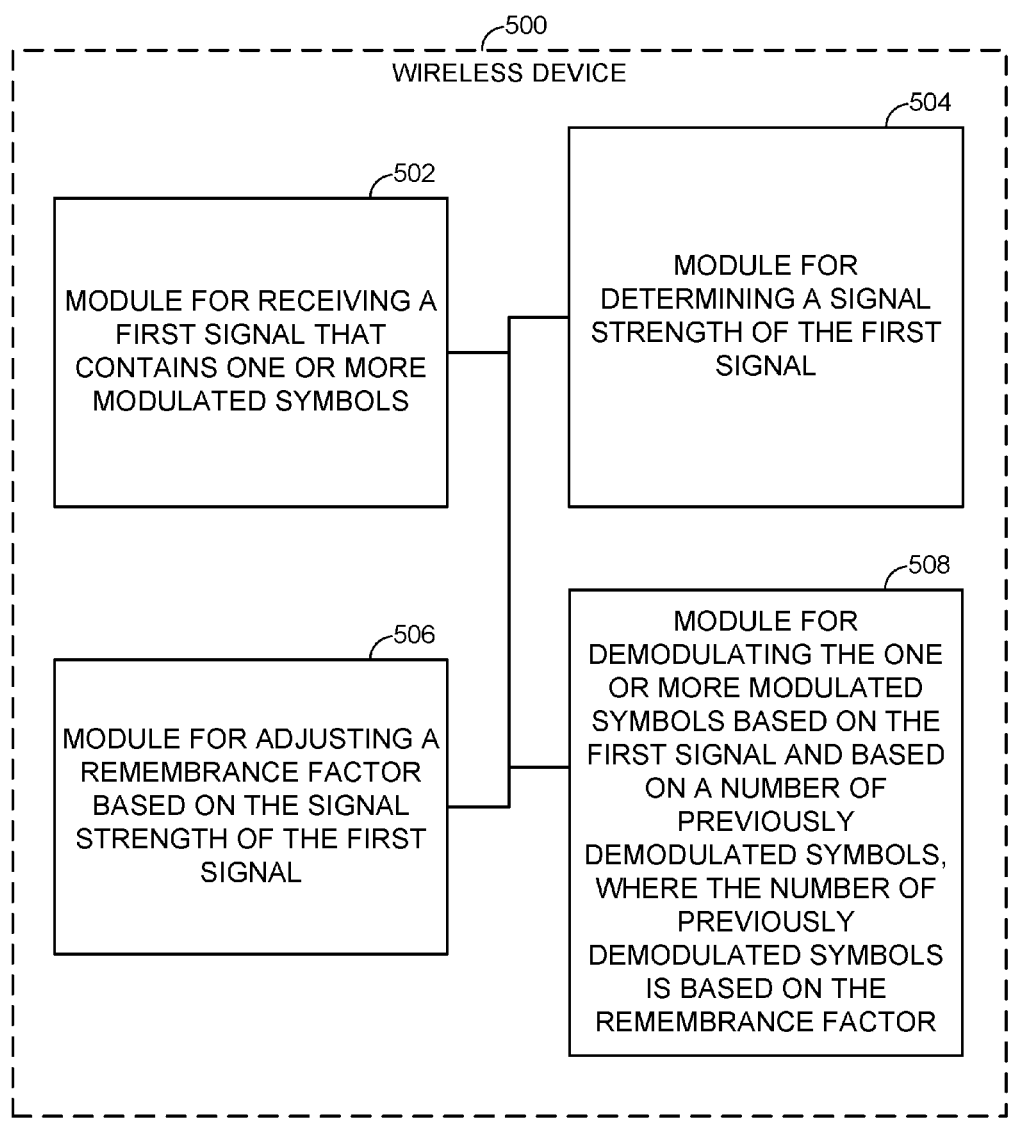
FIG. 5 illustrates an example wireless device represented as a series of interrelated functional modules.

FIG. 5 illustrates an example wireless device represented as a series of interrelated functional modules. A module 502 for receiving a first signal that contains one or more modulated symbols may correspond at least in some aspects to, for example, a communication device 112 or a component thereof as discussed herein (e.g., the RAT transceiver 140). A module 504 for determining a signal strength of the first signal may correspond at least in some aspects to, for example, adaptive memory depth controller 148 (e.g., via signal strength signal 232 such as RSSI, or the like). A module 506 for adjusting a remembrance factor based on the signal strength of the first signal may correspond at least in some aspects to, for example, adaptive memory depth controller 148. A module 508 for demodulating the one or more modulated symbols based on the first signal and based on a number of previously demodulated symbols may correspond at least in some aspects to, for example, demodulator 146.

The functionality of the modules of FIG. 5 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 5, as well as other components and functions described herein, may be implemented using any suitable means. Such means also may be implemented, at least in part, using corresponding structure as taught herein. For example, the components described above in conjunction with the "module for" components of FIG. 5 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for demodulation with a variable remembrance factor.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method performed by a wireless device, the method comprising:
   receiving a first signal that contains one or more modulated symbols;
   determining a signal strength of the first signal;
   adjusting a remembrance factor based on the signal strength of the first signal; and
   demodulating the one or more modulated symbols based on the first signal and based on a number of previously demodulated symbols, wherein the number of previously demodulated symbols is based on the remembrance factor.

2. The method of claim 1, wherein determining the signal strength of the first signal comprises determining a received signal strength indicator (RSSI) of the first signal.

3. The method of claim 1, wherein adjusting the remembrance factor comprises:
   increasing the remembrance factor in response to decreases in the signal strength of the first signal; and
   decreasing the remembrance factor in response to increases in the signal strength of the first signal.

4. The method of claim 1, wherein the one or more modulated symbols includes at least one of: Gaussian Frequency-Shift Keying (GFSK) modulated symbols, Differential Phase-Shift Keying (DPSK) modulated symbols, Differential Quaternary Phase-Shift Keying (DQPSK) modulated symbols, or Differential Encoded 8-Phase Shift Keying (D8PSK) modulated symbols.

5. The method of claim 1, wherein demodulating the one or more modulated symbols comprises demodulating the one or more modulated symbols according to a decision feedback demodulation operation, wherein the remembrance factor controls a memory depth of the decision feedback demodulation operation.

6. The method of claim 5, wherein the one or more modulated symbols includes Differential Phase-Shift Keying (DPSK) modulated symbols and wherein demodulating the DPSK modulated symbols according to the decision feedback demodulation operation comprises determining a metric Y(n) of the first signal at time index n according to:

$$Y(n) = \sum_{k=0}^{n} \alpha^{n-k} e^{-j(\sum_{m=k+1}^{n} \hat{c}(m))} r(k),$$

where $\alpha$ is the remembrance factor, $0 \le \alpha \le 1$, $\hat{c}(m)$ is a demodulated symbol at time index m, and r(k) is the received signal at time index k.

7. The method of claim 5, wherein the one or more modulated symbols includes Gaussian Frequency-Shift Keying (GFSK) modulated symbols, and wherein demodulating the GFSK modulated symbols according to the decision feedback demodulation operation comprises determining a metric M(n) of the first signal at time index n according to:

$$M(n) = \sum_{k=1}^{n} \alpha^{n-k} r(k) e^{j\pi h \Sigma_{m=n-1}^{n-2} d(m)}, \text{ with}$$
$$\Sigma_{m=n-1}^{n-2} d(m) = 0,$$

where $\alpha$ is the remembrance factor, $0 \le \alpha \le 1$, d(m) is a demodulated symbol at time index m, h is a modulation index, and r(k) is the received signal at time index k.

8. The method of claim 1, wherein adjusting the remembrance factor comprises:
   setting the remembrance factor to a first value in response to determining that the signal strength of the first signal is less than a signal strength threshold; and
   setting the remembrance factor to a second value in response to determining that the signal strength of the first signal is greater than or equal to the signal strength threshold.

9. The method of claim 8, wherein the first value is greater than the second value.

10. The method of claim 1, wherein the wireless device is configured to demodulate the one or more modulated symbols according to two or more demodulation modes, the method further comprising:
    determining a demodulation mode of the wireless device;
    selecting a signal strength threshold in response to the demodulation mode, wherein each demodulation mode has an associated value for the signal strength threshold;
    comparing the first signal to the selected signal strength threshold; and
    selecting a value for the remembrance factor from a plurality of values associated with a respective demodulation mode in response to comparing the first signal to the selected signal strength threshold.

11. The method of claim 10, wherein the two or more demodulation modes are selected from the group consisting of: a Gaussian Frequency-Shift Keying (GFSK) mode, a Differential Quaternary Phase-Shift Keying (DQPSK) mode, a Differential Encoded 8-Phase Shift Keying (D8PSK) mode, and a Bluetooth low energy (LE) mode.

12. A wireless device, comprising:
    means for receiving a first signal that contains one or more modulated symbols;
    means for determining a signal strength of the first signal;
    means for adjusting a remembrance factor based on the signal strength of the first signal; and
    means for demodulating the one or more modulated symbols based on the first signal and based on a number of previously demodulated symbols, wherein the number of previously demodulated symbols is based on the remembrance factor.

13. The wireless device of claim 12, wherein the means for demodulating the one or more modulated symbols comprises means for demodulating the one or more modulated symbols according to a decision feedback demodulation operation, wherein the remembrance factor controls a memory depth of the decision feedback demodulation operation.

14. The wireless device of claim 12, wherein means for adjusting the remembrance factor comprises:

means for setting the remembrance factor to a first value in response to determining that the signal strength of the first signal is less than a signal strength threshold; and means for setting the remembrance factor to a second value in response to determining that the signal strength of the first signal is greater than or equal to the signal strength threshold, wherein the first value is greater than the second value.

15. A wireless device, comprising:
at least one processor; and
at least one memory coupled to the at least one processor, the at least one processor and the at least one memory being configured to direct the wireless device to:
receive a first signal that contains one or more modulated symbols;
determine a signal strength of the first signal;
adjust a remembrance factor based on the signal strength of the first signal; and
demodulate the one or more modulated symbols based on the first signal and based on a number of previously demodulated symbols, wherein the number of previously demodulated symbols is based on the remembrance factor.

16. The wireless device of claim 15, wherein the one or more modulated symbols includes at least one of: Gaussian Frequency-Shift Keying (GFSK) modulated symbols, Differential Phase-Shift Keying (DPSK) modulated symbols, Differential Quaternary Phase-Shift Keying (DQPSK) modulated symbols, or Differential Encoded 8-Phase Shift Keying (D8PSK) modulated symbols.

17. The wireless device of claim 15, wherein the at least one processor and the at least one memory are further configured to demodulate the one or more modulated symbols according to a decision feedback demodulation operation, wherein the remembrance factor controls a memory depth of the decision feedback demodulation operation.

18. The wireless device of claim 15, wherein the at least one processor and the at least one memory are further configured to:
set the remembrance factor to a first value in response to determining that the signal strength of the first signal is less than a signal strength threshold; and
set the remembrance factor to a second value in response to determining that the signal strength of the first signal is greater than or equal to the signal strength threshold, wherein the first value is greater than the second value.

19. The wireless device of claim 15, wherein the wireless device is configured to demodulate the one or more modulated symbols according to two or more demodulation modes, and wherein the at least one processor and the at least one memory are further configured to:
determine a demodulation mode of the wireless device;
select a signal strength threshold in response to the demodulation mode, wherein each demodulation mode has an associated value for the signal strength threshold;
compare the first signal to the selected signal strength threshold; and
select a value for the remembrance factor from a plurality of values associated with a respective demodulation mode in response to comparing the first signal to the selected signal strength threshold.

* * * * *